(12) United States Patent
Doherty et al.

(10) Patent No.: US 10,140,194 B2
(45) Date of Patent: Nov. 27, 2018

(54) STORAGE SYSTEM TRANSACTIONS

(71) Applicant: HEWLETT PACKARD ENTERPRISE DEVELOPMENT LP, Houston, TX (US)

(72) Inventors: Mark Doherty, Belfast (GB); Siamak Nazari, Fremont, CA (US); Jonathan Stewart, Belfast (GB); Richard Dalzell, Belfast (GB); Peter Hynes, Dundrum (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 63 days.

(21) Appl. No.: 15/114,900

(22) PCT Filed: Mar. 20, 2014

(86) PCT No.: PCT/US2014/031328
§ 371 (c)(1),
(2) Date: Jul. 28, 2016

(87) PCT Pub. No.: WO2015/142339
PCT Pub. Date: Sep. 24, 2015

(65) Prior Publication Data
US 2016/0350192 A1    Dec. 1, 2016

(51) Int. Cl.
G06F 11/00    (2006.01)
G06F 11/20    (2006.01)
(Continued)

(52) U.S. Cl.
CPC .......... G06F 11/2092 (2013.01); G06F 3/065 (2013.01); G06F 3/067 (2013.01);
(Continued)

(58) Field of Classification Search
CPC ............ G06F 11/2017; G06F 11/0727; G06F 11/1658
See application file for complete search history.

(56) References Cited

U.S. PATENT DOCUMENTS 7,111,197 B2   9/2006   Kingsbury et al.
7,149,853 B2   12/2006  Krueger
(Continued)

FOREIGN PATENT DOCUMENTS

CN    101354682    1/2009
CN    101563674    10/2009
(Continued)

OTHER PUBLICATIONS

International Search Report & Written Opinion received in PCT Application No. PCT/US2014/031328, dated Dec. 15, 2014, 9 pages.
(Continued)

Primary Examiner — Charles Ehne
(74) Attorney, Agent, or Firm — International IP Law Group, PLLC

(57) ABSTRACT

A system that includes a storage volume comprising a plurality of regions. The system also includes a plurality of nodes to receive transactions related to the storage volume from one or more client computers and execute the transactions. Each node is designated as an owner of one region of the plurality of regions. Each one of the plurality of nodes includes a ticket dispenser for dispensing tickets that ensure that the transactions that are actively being executed have exclusive access to a storage object identified in the transaction.

20 Claims, 4 Drawing Sheets

(51) Int. Cl.
    *G06F 13/38*    (2006.01)
    *G06F 3/06*     (2006.01)
    *G06F 11/14*    (2006.01)

(52) U.S. Cl.
    CPC .......... *G06F 3/0619* (2013.01); *G06F 3/0665* (2013.01); *G06F 3/0689* (2013.01); *G06F 11/1474* (2013.01); *G06F 11/2025* (2013.01); *G06F 13/385* (2013.01)

(56) References Cited

U.S. PATENT DOCUMENTS

| | | | |
|---|---|---|---|
| 7,155,745 B1* | 12/2006 | Shin .................. | G06F 9/547 726/27 |
| 7,240,057 B2 | 7/2007 | Kingsbury et al. | |
| 7,266,722 B2 | 9/2007 | Kingsbury | |
| 7,277,952 B2 | 10/2007 | Nishanov et al. | |
| 7,437,386 B2 | 10/2008 | Callahan et al. | |
| 7,496,646 B2 | 2/2009 | Casper et al. | |
| 7,835,510 B2* | 11/2010 | Akachi .................. | H04N 7/15 379/202.01 |
| 7,840,730 B2 | 11/2010 | D'Amato et al. | |
| 7,958,548 B2* | 6/2011 | Busboom .............. | H04L 63/10 713/168 |
| 8,213,432 B2 | 7/2012 | Takemura et al. | |
| 8,346,719 B2 | 1/2013 | Sudhakar | |
| 8,630,979 B2 | 1/2014 | Surtani et al. | |
| 2003/0149854 A1* | 8/2003 | Yoshino .............. | G06F 12/1458 711/173 |
| 2003/0188117 A1* | 10/2003 | Yoshino .............. | G06F 21/6218 711/164 |
| 2003/0188218 A1 | 10/2003 | Lubbers et al. | |
| 2004/0202013 A1 | 10/2004 | Dove et al. | |
| 2007/0022264 A1 | 1/2007 | Bromling et al. | |
| 2008/0104687 A1* | 5/2008 | Fujiwara ............... | H04W 12/02 726/10 |
| 2008/0189498 A1 | 8/2008 | Brown | |
| 2011/0296515 A1* | 12/2011 | Krstic .................. | G06F 21/53 726/10 |
| 2012/0110636 A1 | 5/2012 | Van Biljon et al. | |
| 2012/0159005 A1 | 6/2012 | D'Amato et al. | |
| 2013/0047216 A1* | 2/2013 | Ajitomi .................. | G06F 9/541 726/4 |
| 2013/0145105 A1 | 6/2013 | Sawicki et al. | |

FOREIGN PATENT DOCUMENTS

| | | |
|---|---|---|
| CN | 102937917 | 2/2013 |
| WO | WO-2008074520 | 6/2008 |

OTHER PUBLICATIONS

Spiers, J., "Storage Clustering," (Web Page), Mar. 17, 2005, 2 pages, available at http://www.wwpi.com/index.php?option=com_content&view=article&id=329:storage-cluste.

Wu, C. et al., "Improving I/O Performance of Clustered Storage Systems by Adaptive Request Distribution," (Research Paper), 2006 15th IEEE International Conference on High Performance Distributed Computing, Aug. 29, 2006, pp. 207-217, available at http://ieeexplore.ieee.org/stamp/stamp.jsp?arnumber=1652152.

Colorado State University at Lockheed-Martin, "Lecture 5," Distributed Operating Systems: CS551, 2001, http://www.cs.colostate.edu/~cs551/CourseNotes/LM/LM.Lecture5.ppt.

Kronenberg et al., "VAXciuster: a closely-coupled distributed system," May 1986, ACM Transactions on Computer Systems (TOCS), vol. 4, No. 2, pp. 130-146.

Schaubie, "Notes on Synchronization in Distributed Operating Systems," Jan. 2004, CS551, Colorado State University, <http://www.cs.colostate.edu~cs551/CourseNotes/Synchronization/SynchTOC.html>.

Wikipedia, "Distributed lock manager," Mar. 10, 2014, https://en.wikipedia,org/w/index.php?title=Distributed_lock_manager&oldid=598965512.

Wikipedia, "Token passing," May 11, 2013, https://en.wikipedia.org/w/index.php?title=Token_passing&oldid=554598013.

* cited by examiner

400

STORAGE SYSTEM TRANSACTIONS

BACKGROUND

Many large-scale storage systems are configured as highly-available, distributed storage systems. Such storage systems incorporate a high level of redundancy to improve the availability and accessibility of stored data. For example, a clustered storage system can include a network of controller nodes that control a number of storage devices. A large number of nodes can be configured to have access to the same storage devices, and the nodes themselves can also be communicatively coupled to each another for internode communications. This configuration enables load balancing between the nodes and failover capabilities in the event that a node fails.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure provides techniques for sequencing and tracking Input/Output (I/O) transactions in a storage system. In a storage system with redundant storage controllers, also referred to herein as nodes, two or more nodes may have access to the same storage space. An I/O collision is a phenomenon in which one or more nodes attempt to access the same storage object at the same time. One way to protect against I/O collisions is to provide a centralized manager node that prevents other nodes from accessing the same storage object at the same time. The centralized manager node can act as a centralized ticket distributer that can issue tickets to other nodes in the storage system. Each issued ticket ensures that the node issued the ticket will have exclusive access to the storage object accessed by the transaction. One drawback of such a centralized ticket distributer is the process of requesting tickets can result in high levels of internode traffic, in which the centralized manager node may become a bottleneck. The techniques described herein provide a distributed ticket dispensing function wherein each node includes its own ticket dispenser and owns a designated region of a storage volume. The owner node of each region is in control of ensuring that I/O collisions do not occur. To ensure that transactions are not dropped if a node fails, each node can be configured to each ticket to a designated backup node. Examples of the distributed ticket system are described more fully below in relation to FIGS. 1 and 2.

Figure 1:
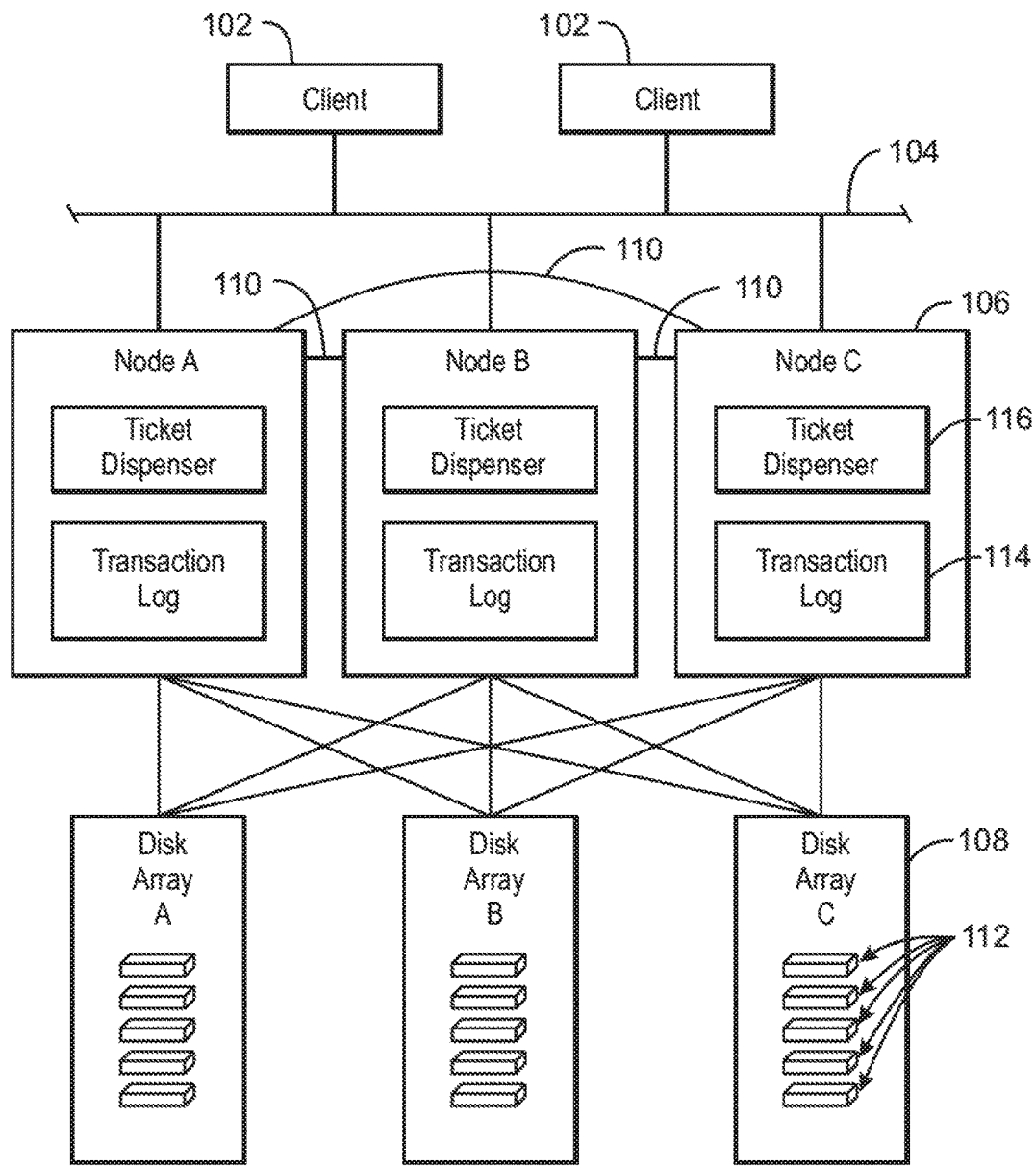
FIG. 1 is an example block diagram of a storage system with distributed ticket dispensing.

FIG. 1 is an example block diagram of a storage system with distributed ticket dispensing. It will be appreciated that the storage system 100 shown in FIG. 1 is only one example of a storage system in accordance with embodiments. In an actual implementation, the storage system 100 may include various additional storage devices and networks, which may be interconnected in any suitable fashion, depending on the design considerations of a particular implementation. For example, a large storage system will often have many more client computers and storage devices than shown in this illustration.

The storage system 100 provides data storage resources to any number of client computers 102, which may be general purpose computers, workstations, mobile computing devices, and the like. The client computers 102 can be coupled to the storage system 100 through a network 104, which may be a local area network (LAN), wide area network (WAN), a storage area network (SAN), or other suitable type of network. The storage system 100 includes storage controllers, referred to herein as nodes 106. The storage system 100 also includes disk arrays 108, which are controlled by the nodes 106. The nodes 106 may be collectively referred to as a computer cluster. For the sake of simplicity, only three nodes are shown. However, it will be appreciated that the computer cluster can include any suitable number of nodes, including 2, 4, 6, 10, or more.

The client computers 102 can access the storage space of the disk arrays 108 by sending Input/Output (I/O) requests, including write requests and read requests, to the nodes 106. The nodes 106 process the I/O requests so that user data is written to or read from the appropriate storage locations in the disk arrays 108. As used herein, the term "user data" refers to data that a person might use in the course of business, performing a job function, or for personal use, such as business data and reports, Web pages, user files, image files, video files, audio files, software applications, or any other similar type of data that that a user may wish to save to long term storage. Each of the nodes 106 can be communicatively coupled to each of the disk arrays 108. Each node 106 can also be communicatively coupled to each other node by an inter-node communication network 110.

The disk arrays 108 may include any suitable type of storage devices, referred to herein as drives 112. For examples, the drives 112 may be solid state drives such as flash drives, hard disk drives, and tape drives, among others. Furthermore, the storage system 100 can include more than one type of storage component. For example, one disk array 108 may be an array of hard disk drives, and another disk array 108 may be an array of flash drives. In some examples, one or more disk arrays may have a mix of different types of storage. The storage network system 100 may also include additional storage devices in addition to what is shown in FIG. 1.

Requests by the client computers 102 to access storage space are referred to herein as transactions. Examples of types of transactions include write operations, read operations, storage volume metadata operations, and reservation requests, among others. In some examples, the client computer 102 is a remote client and the transactions are for remote replication of data. Each client computer 102 may be coupled to a plurality of the nodes 106. In some examples, one of the nodes 106 is designated as primary node for the client computer 102, which is the node that receives all of the transactions generated by the client computer 102. Transactions received by the primary node may be transferred to a different node in the cluster for execution, as described more fully with reference to FIG. 2.

As each transaction is processed, the transaction is sequenced and saved to a transaction log 114 to ensure that the transaction does not conflict with other transactions, and is not lost during normal or adverse operating conditions. The transaction log entries are referred to as herein as tickets, and the component that manages the tickets is described as the ticket dispenser 116. As shown in FIG. 1, each node has its own ticket dispenser 116 and transaction log 114. The issuance of a ticket from the ticket dispenser is a guarantee of exclusive access to the object for the requested region while the transaction is being executed. Any transaction that collides with an active transaction to the same object will be deferred until the active transaction has completed. On completion of an active transaction, any deferred transactions will be once again compared against the active transactions to determine whether any deferred transactions can now be executed.

Each transaction that is received by the computer cluster is also stored in a highly available log in the event of a failure of one or more nodes 106 within the cluster. The ticket dispenser 116 of the node 106 that is responsible for logging a particular transaction will store the parameters of the transaction in a location that can be recovered by a backup node of the cluster. If a node encounters a failure, the transaction data stored in this location can be recovered and the transaction replayed for continuity of service. Each node 106 may include its own separate cluster memory (not shown), which buffers the information transferred to it, including transaction information, and log information, among other information. The cluster memory can be implemented as any suitable cache memory, for example, synchronous dynamic random access memory (SDRAM).

Each node will be responsible for a particular region of storage space within the storage system 100. For each transaction, the ticket dispenser 116 of the specific node 106 that is responsible for the region affected by the transaction will issue the ticket for the transaction and log the transaction. Each node is also responsible for preventing I/O collisions for the region under its control. In this way, ticket dispensing and transaction logging is distributed across all of the nodes of the system rather than being the centralized at a single point of authority in the system. Since each node has direct access to its own ticket dispenser 116, the distributed ticket dispenser model reduces internode communications and also reduces locking contention during operation, which significantly improves performance. The distributed ticket dispenser model also reduces contention to resources by splitting up the resource pool from a single point into multiple points across the cluster.

Figure 2:
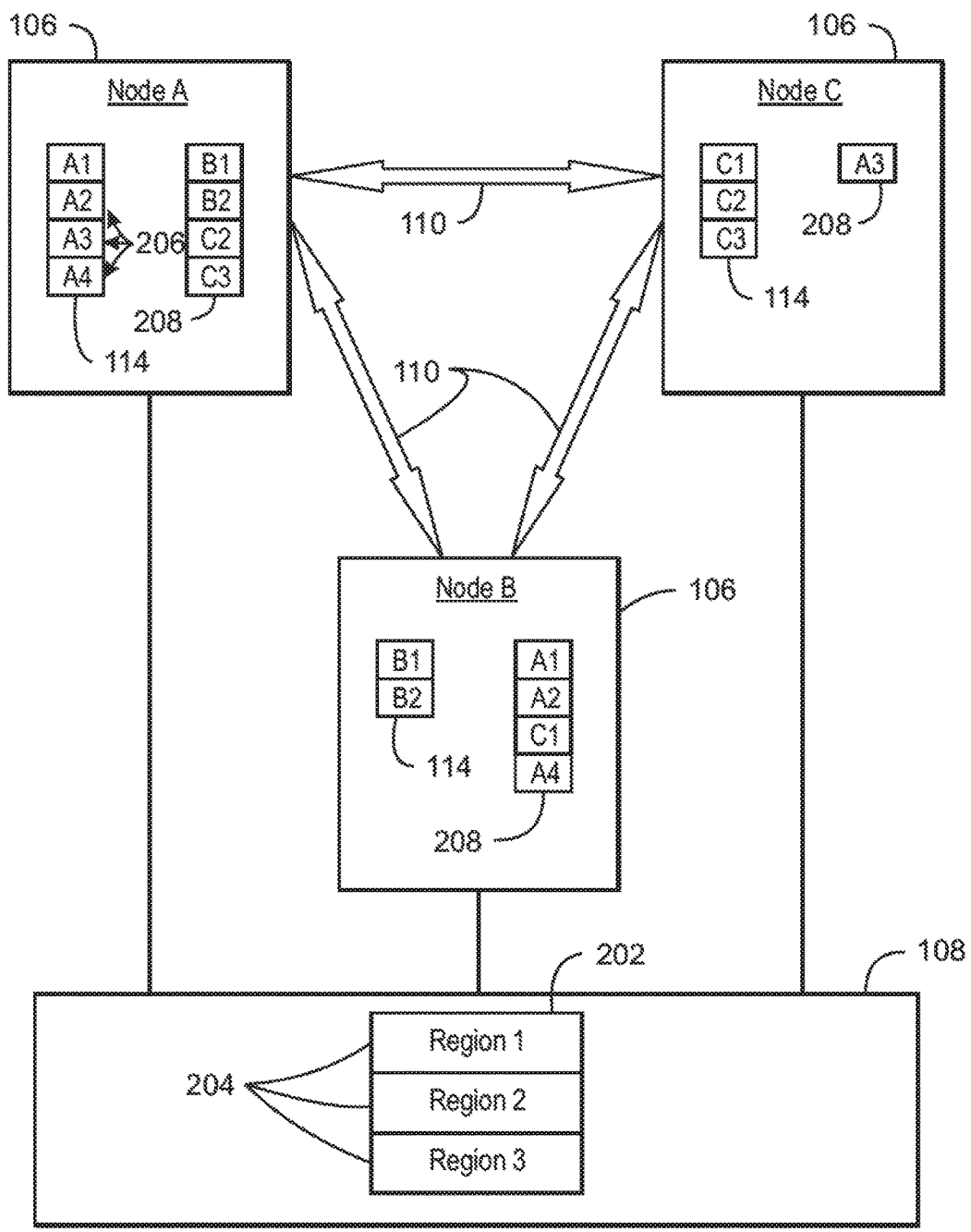
FIG. 2 is an example block diagram of a storage system with distributed ticket dispensing.

FIG. 2 is an example block diagram of a storage system with distributed ticket dispensing. More specifically, FIG. 2 shows the system of FIG. 1, wherein the nodes 106 are coupled to a logical storage volume 202. The logical storage volume 202 may be provisioned from the available storage space of any suitable storage drive 112 or combination of storage drives 112 included in the disk arrays 108. The volume is further divided in regions 204, shown in FIG. 2 as Region 1, Region 2, and Region 3. Each node 106 controls a specific region 204 and is referred to herein as the owner for that region. For purposes of the present description, Node A is configured to be the owner of Region 1, Node B is configured to be the owner Region 2, and Node C is configured to be the owner Region 3. Each node 106 is responsible for preventing I/O collisions for each region 204 that it owns. Thus, each node 106 is responsible for issuing tickets and logging transactions pertaining to the region 204 that it owns. In some examples, each node 106 is also responsible for executing those transactions that affect the region 204 that it owns.

Although not shown in FIG. 2, each node is coupled to a plurality of client computers, such as the client computers 102 of FIG. 1. Each client 102 is associated with a node 106 that is designated as the client's primary node. Transactions sent to the cluster from a client computer 102 will be sent to the client's primary node. In some cases, the client's primary node 106 may not be the owner of the region 204 affected by the transaction. If the primary node 106 is not the owner of the region 204 affected by the transaction, the primary node forwards the transaction to the node 106 that does own the affected region 204. When the owner of the region 204 affected by the transaction receives the transaction, the owner node 106 controls the issuance of the ticket for the transaction and executes the transaction. Following the ownership example set forth above, if Node C receives a transaction that pertains to Region 2, the transaction will be forwarded to Node B (the owner for Region 2) for processing.

The transaction for which a ticket is being requested may be referred to herein as the pending transaction. Executing a transaction refers to processing the transaction on the storage volume, for example, writing data to the storage volume or reading data from the storage volume. A transaction that is actively being executed will be referred to herein as an active transaction. In FIG. 2, the transaction log 114 for each node 106 is shown as including several transaction log entries, referred to herein as tickets 206, each representing an active transaction. For example, Node A has four tickets 206 labeled A1 through A4. In FIG. 2, the letter represents the identifier for the node 106 that issued the ticket 206 and the number represents the sequence number for the transaction. It will be appreciated that the ticket labels are simplified for the purpose of the present description.

To issue the ticket 206, the owner node 106 checks its copy of the transaction log 114 to determine if there is an active transaction involving the object affected by the pending transaction. If there is an active transaction involving the object affected by the pending transaction, no ticket is issued. The pending transaction may be cached by the owner node awaiting the issuance of a ticket. When the affected object is no longer involved in an active transaction, the ticket dispenser 116 of the owner node can issue the ticket 206. In this way, the owner node prevents I/O collisions for the region that it owns.

If there is no active transaction involving the object affected by the pending transaction, the owner node issues a ticket 206 for the transaction and stores the ticket in its own transaction log 114 as a transaction log entry. After issuing the ticket, the owner node executes the transaction. For example, executing the transaction can include writing the data received from the client 102 to storage or reading data from storage and sending the requested data to the client 102, depending on the transaction type. When the owner node is finished executing the transaction, the owner node sends an acknowledgment to the host and erases the ticket from the transaction log 114.

Each transaction log entry, referred to here as a ticket, can include all of the information related to executing the transaction, such as the storage address affected by the transaction, and whether the transaction is a read or a write. If the transaction is a read operation, the ticket can include an identification of where the data is to be sent after the read. The ticket also includes a sequence number and an identifier that is unique to the issuing node and indicates which node 106 issued the ticket. The sequence number is a number that is incremented for each ticket and can indicate the order in which transactions are to be executed. All of the tickets 206 issued by a node 106 are stored to its own transaction log 114. Additionally, each ticket 206 may also be sent to a backup node to be used in the event of node failure, as discussed further below.

In some cases, a node 106 may receive a transaction that spans two regions 204, which are controlled by two different owner nodes 106. If a transaction spans two regions 204, the transaction can be split into two transactions and treated as two different transactions, with the owner node 106 of each region 204 issuing tickets 206 for the transaction pertaining to the region 204 it controls. For example, if Node B receives a transaction spanning Region 1 (owned by Node A) and Region 3 (owned by Node C), then Node B would generate two transactions such that each transaction only pertains to one region. In this example, Node B would then forward to Node A the transaction affecting Region 1, and forward to Node C the transaction affecting Region 3.

The transaction log can be used in the event of node failure to recover transactions that were being processed by the failed node 106. For each transaction, the owner node sends the ticket to one backup node. The backup node saves the ticket to another log, referred to herein as the backup log 208. The backup node may be chosen on a per-transaction basis. In other words, each transaction can be evaluated separately to determine which node 106 to use as the backup node for the transaction.

In some examples, the backup node is selected based on the type of transaction and the object that the transaction relates to. For example, each transaction will relate to a particular object whose storage space is provisioned to a particular region 204. As an example, the object may be a particular storage drive or some other block of storage space. Each object also has a designated backup node that will become the new owner node for that object if the original owner node for region associated with the object fails. The backup node for a transaction can be designated as the node that will become the owner of the associated object in the event of a node failure. By following the same failover relationship for the object and the related transaction, the distributed ticket dispenser can recover these transactions efficiently following a node down event.

In the event of a failure of a node 106, control of the region 204 owned by the failed node will be distributed to other nodes 106 in accordance with the pre-established fail-over procedure. Each node will also search its own backup log to determine if there are any active transactions pertaining to the failed node. The new owner node will then replay any active transactions pertaining to the failed node that are found in the backup log. Because the new owner node is the owner of both the transaction and the region pertaining to the transaction, the new owner node can execute the transaction without having to transfer the transaction to a different node.

In the example shown in FIG. 2, Node A has 4 active transactions, which are represented in the transaction log 114 as tickets A1, A2, A3, and A4. For the sake of the present examples, each transaction will be considered a write transaction. However, it will be appreciated that the transactions can be any suitable transaction affecting the storage volume 108. All four tickets affect Region 1, which is owned by Node A. Additionally, tickets for each transaction have also been sent to designated backup nodes. The transactions related to tickets A1, A2, and A4 are writes to an address space that is currently owned by Node A, but is designated to become owned by Node B if Node A fails. Thus, the tickets A1, A2, and A4 have been sent to Node B. If Node A fails, Node B will take ownership of the storage object or objects pertaining to tickets A1, A2, and A4, and execute the transactions by writing the data to the address identified in the ticket. If there are write ordering constraints, the tickets' sequence numbers ensure that the writes are executed in the correct order.

Figure 3:
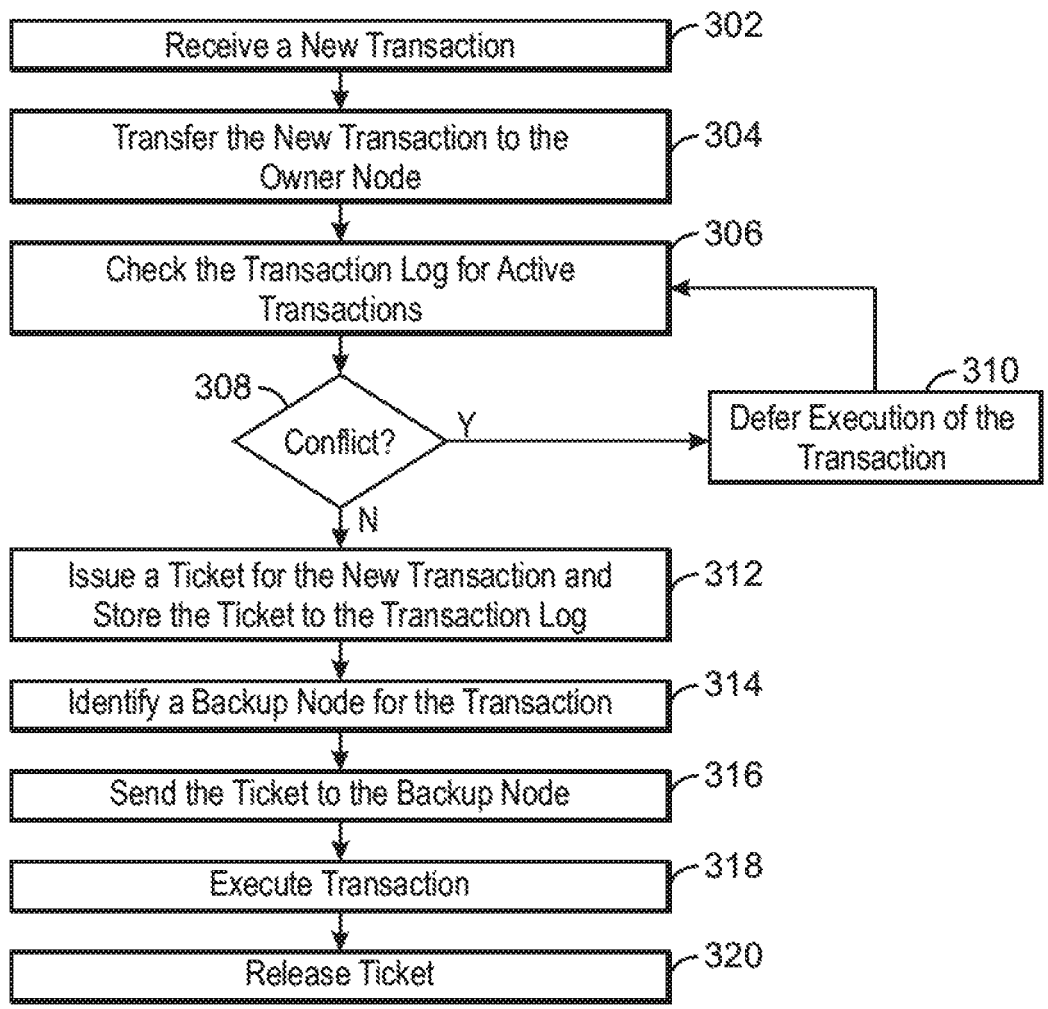
FIG. 3 is an example process flow diagram of a method of processing transaction is a storage system with distributed ticket dispensing.

FIG. 3 is an example process flow diagram of a method of processing transaction is a storage system with distributed ticket dispensing. The method 300 can be performed by one or more storage controllers such as the nodes 106 shown in FIG. 1.

At block 302, a new transaction is received at one of the nodes of the computer cluster from one of the client computers. The transaction may be a read transaction or a write transaction, among others. The transaction is targeted at a specific storage volume provisioned from the storage space available in the storage system.

At block 304, the new transaction is transferred to the owner node of the plurality of nodes of the cluster. The owner node is the node that controls the region of the storage volume that is affected by the transaction. In some cases, the transaction may be received directly by the owner node, in which case transferring the node to the owner node means keeping the transaction at the owner node, which originally received it. Blocks 306 to 318 are all preformed at the owner node.

At block 306, the owner node checks its transaction log for active transactions being executed by the owner node. This is done to determine whether there is a conflict between the new transaction and an active transaction, such as an I/O collision. If at block 308, there is a conflict between the new transaction and an active transaction, the process flow advances to block 310.

At block 310, the execution of the transaction is deferred, meaning that no ticket is issued for the transaction and the transaction is not executed. The deferred transaction may be blocked, or in some examples, stored to a buffer for later execution. After the completion of an active transaction, the process flow returns to block 306, and another check of a conflicting transaction is performed. Blocks 306, 308, and 310 can be repeated until all conflicting transactions have finished executing and are no longer active. If at block 308, it is determined that there are no conflicting active transactions, the process flow can continue to block 312.

At block 312, the ticket dispenser of the owner node issues ticket for the new transaction. Ticket ensures exclusive access to a storage object that is affected by the transaction. The ticket is stored to the transaction log of the owner node.

At block 314, the owner node identifies a backup node for the transaction. In some examples, the backup node is identified by determining how the storage object affected by the transaction will be handled in the event of a node failure. For example, whatever node would become the new owner of the storage object if the present node failed, can be designated as the backup node.

At block 316, the ticket issued for the transaction is sent to the backup node. The backup node, upon receiving the ticket, stores the ticket to memory but takes no action regarding the ticket unless the node that it received the ticket from fails.

At block 318, the transaction is executed on the storage volume according to the type of transaction and the storage location specified in the transaction. For example, if the transaction is a write, the data included in the transaction is written to the memory addresses specified in the transaction.

At block 320, the ticket is released and the process flow ends. To release the ticket, the ticket is erased form the transaction log and also removed from the backup node. The method described above can be performed each time a new transaction is received.

Figure 4:
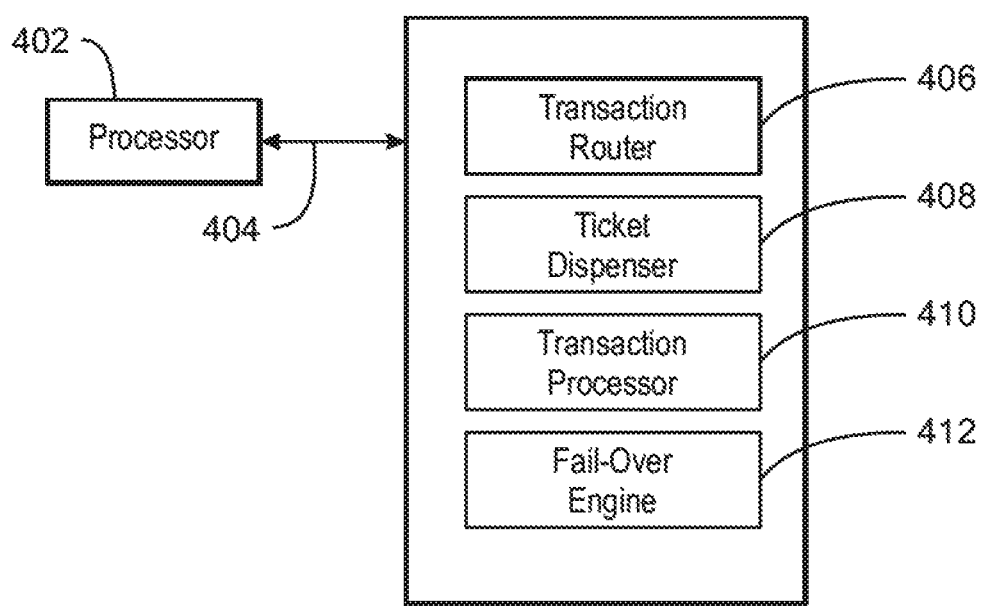
FIG. 4 is an example block diagram showing a tangible, non-transitory, computer-readable medium that stores code configured to operate a node of a storage system with distributed ticket dispensing.

FIG. 4 is an example block diagram showing a tangible, non-transitory, computer-readable medium that stores code configured to operate a node of a storage system with distributed ticket dispensing. The computer-readable medium is referred to by the reference number 400. The computer-readable medium 400 can include RAM, a hard disk drive, an array of hard disk drives, an optical drive, an array of optical drives, a non-volatile memory, a flash drive, a digital versatile disk (DVD), or a compact disk (CD), among others. The computer-readable medium 400 may be accessed by a processor 402 over a computer bus 404. Furthermore, the computer-readable medium 400 may include code configured to perform the methods described herein. For example, the computer readable medium 400 may include firmware that is executed by a storage controller such as the nodes 106 of FIGS. 1 and 2.

The various software components discussed herein may be stored on the computer-readable medium 400. In a clustered computing system such as the one shown in FIGS. 1 and 2, each of the components will be running on each of the nodes. For purposes of the present description, the node one which a component is running will be described as the home node with respect to that component. A region 406 can include a transaction router that, upon receipt of a transaction from a client computer, determines if the home node is the owner of the region affected by the transaction. If the home node is not the owner, the owner node for that transaction is identified and the transaction is forwarded to the owner node. Otherwise, if the home node is the owner, the transaction is processed by the home node. A region 408 can include a ticket dispenser that issues tickets to transactions and ensures that I/O collisions do not occur by checking newly received transaction to a log of active transactions. A region 410 can include a transaction processor that requests tickets for transactions and executes active transactions that have received a ticket. The transaction processor can also designate a backup node for each transaction and send the corresponding ticket to the backup node. A region 412 can include a fail-over engine that can detect the failure of another node in the cluster. Upon detecting the failure of a node, the fail-over engine can check its memory for any tickets sent to it from the failed node. Any tickets sent to it by the failed node will be executed by the fail-over engine.

Although shown as contiguous blocks, the software components can be stored in any order or configuration. For example, if the tangible, non-transitory, computer-readable medium is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system comprising:
   a first node of a plurality of nodes, the first node to receive transactions related to a storage volume, wherein the storage volume comprises a plurality of regions, and wherein each of the plurality of nodes is designated as an owner of a respective region of the plurality of regions to control the issuance of tickets for transactions affecting the respective region; and
   wherein the first node comprises a controller to execute instructions to dispense tickets for the received transactions that affect the respective region owned by the first node, each ticket to ensure exclusive access to a storage object identified in the received transaction for which the ticket was issued while the received transaction is executed.

2. The system of claim 1, wherein only the node that is the owner of one of the regions can execute transactions affecting the one of the regions.

3. The system of claim 1, wherein the controller of the first node is further to, for each ticket dispensed by the first node, store the ticket in a transaction log of the first node, wherein the transaction log is used to check transactions that are actively being executed when a new transaction is received.

4. The system of claim 1, wherein the controller of the first node is further to, for each ticket dispensed by the first node, send the ticket to another node of the plurality of nodes that has been designated as a backup node for the transaction.

5. The system of claim 4, wherein the backup node for a given transaction is the node, of the plurality of nodes, designated to take ownership of a given storage object identified in the given transaction if the first node that dispensed the ticket fails.

6. The system of claim 1, wherein each of the plurality of nodes is responsible for preventing input/output (I/O) collisions for the respective region for which the node is designated as the owner.

7. The system of claim 1, wherein the controller of the first node is to execute instructions to dispense tickets for the received transactions that affect storage objects provisioned to the respective region owned by the first node.

8. The system of claim 1, wherein:
   the first node is to receive at least some of the transactions from one or more client computers; and
   the controller of the first node is to execute the received transactions that affect the respective region owned by the first node.

9. The system of claim 1, wherein the first node is to receive at least one of the transactions from a second node of the plurality of nodes.

10. A method comprising:
    receiving a new transaction at a first node of a plurality of nodes, wherein each of the plurality of nodes is designated as an owner of a respective region of a plurality of regions of a storage volume to control the issuance of tickets for transactions affecting the respective region, the first node comprising a controller; and
    when the new transaction affects the respective region owned by the first node, with the controller of the first node:
       checking a transaction log of the first node for active transactions being executed by the first node; and
       in response to a determination that the new transaction does not conflict with any of the active transactions, issuing a ticket for the new transaction, wherein the ticket is to ensure exclusive access to a storage object that is affected by the new transaction while the new transaction is executed.

11. The method of claim 10, further comprising storing the ticket to the transaction log of the first node.

12. The method of claim 10, further comprising sending the ticket to a backup node of the plurality of nodes.

13. The method of claim 12, wherein the backup node is the node that is designated to become the new owner node of the storage object if the first node fails.

14. The method of claim 12, further comprising, with the first node:
receiving another ticket from a second node of the plurality of nodes; and
storing the another ticket to a backup log.

15. The method of claim 14, comprising, with the first node:
detecting failure of the second node;
taking ownership f one of the storage objects of a respective region owned by the second node; and
executing an active transaction represented by a ticket in the backup log.

16. The method of claim 10, further comprising:
a second node of the plurality of nodes receiving the new transaction from a client computer; and
the second node transferring the new transaction to the first node in response to a determination that the respective region affected by the new transaction affects is owned by the first node.

17. A tangible, non-transitory, computer-readable medium comprising instructions executable to cause a processor to:
receive a new transaction at a first node of a plurality of nodes of a storage system, the storage system comprising a storage volume comprising a plurality of regions, and wherein each of the plurality of nodes is designated as an owner of a respective region of the plurality of regions to control the issuance of tickets for transactions affecting the respective region;
in response to a given region affected by the new transaction being owned by a second node of the plurality of nodes, send the transaction to the second node for execution by the second node; and
in response to the given region affected by the new transaction being owned by the first node:
check a transaction log of the first node for active transactions being executed by the first node;
in response to a determination that the new transaction does not conflict with any of the active transactions:
issue a ticket for the new transaction, the ticket to ensure exclusive access to a storage object in the given region that is affected by the new transaction while the new transaction is executed; and
execute the new transaction.

18. The computer-readable medium of claim 17, the instructions executable to cause the processor to store the ticket to the transaction log of the first node, and send the ticket to a backup node of the plurality of nodes.

19. The computer-readable medium of claim 18, wherein the backup node is one of the plurality of nodes designated to become the new owner node of the storage object if the first node fails.

20. The computer-readable medium of claim 17, instructions executable to cause the processor to receive another ticket from the second node and store the another ticket to a backup log of the first node.

* * * * *